(12) United States Patent
Shastri et al.

(10) Patent No.: US 8,651,389 B2
(45) Date of Patent: Feb. 18, 2014

(54) SYSTEM AND METHOD FOR IDENTIFYING AND TRACKING SHOPPING CARTS

(75) Inventors: Lokendra Shastri, Madhya Pradesh (IN); Ayushmaan Basu, Maharashtra (IN)

(73) Assignee: Infosys Limited, Karnataka (IN)

( * ) Notice: Subject to any disclaimer, the term of this patent is extended or adjusted under 35 U.S.C. 154(b) by 0 days.

(21) Appl. No.: 13/073,289

(22) Filed: Mar. 28, 2011

(65) Prior Publication Data

US 2012/0193408 A1   Aug. 2, 2012

(30) Foreign Application Priority Data

Feb. 2, 2011   (IN) .............................. 305/CHE/2011

(51) Int. Cl.
| G06K 19/06 | (2006.01) |
| G06F 17/00 | (2006.01) |
| G06F 19/00 | (2011.01) |
| G06K 7/14 | (2006.01) |

(52) U.S. Cl.
USPC ........... 235/494; 235/375; 235/385; 235/454; 235/487

(58) Field of Classification Search
USPC .......... 235/375, 382, 384, 385, 454, 487, 494
See application file for complete search history.

(56) References Cited

U.S. PATENT DOCUMENTS

| 5,725,253 A   * |  3/1998 | Salive et al. .................... 283/67 |
| 6,327,395 B1 * | 12/2001 | Hecht et al. .................... 382/306 |
| 6,446,865 B1 * |  9/2002 | Holt et al. ...................... 235/382 |
| 7,321,305 B2   |  1/2008 | Gollu |
| 2002/0121547 A1 |  9/2002 | Weith et al. |
| 2006/0239506 A1 | 10/2006 | Zhang et al. |
| 2007/0152057 A1 |  7/2007 | Cato et al. |
| 2008/0035730 A1 * |  2/2008 | Look ........................ 235/462.07 |
| 2010/0008597 A1 * |  1/2010 | Findlay et al. ................ 382/275 |
| 2011/0052053 A1 * |  3/2011 | Tomaselli et al. ............. 382/167 |

* cited by examiner

*Primary Examiner* — Christle Marshall
*Assistant Examiner* — Claude J Brown
(74) *Attorney, Agent, or Firm* — Michael Best & Friedrich LLP

(57) ABSTRACT

A method for designing identity plates which are placed on corresponding shopping carts is provided. A unique identity data is represented on each identity plate using an identification code. The unique identity data is encoded employing symbols having distinct physical characteristics. The association between the symbols and the identification code is predetermined. The method enables identifying shopping carts by capturing images of the shopping carts using video sensors and decoding identity data on each identity plate placed on each shopping cart. The identity data is decoded by recognizing symbols based on physical characteristics and translating recognized symbols to corresponding identity data referring to the predetermined association between the symbols and identification code. Identity data of shopping carts, identity data of video sensors and timestamp information is used for identifying location of video sensors using which path taken by shopping carts in the retail store is tracked.

20 Claims, 3 Drawing Sheets

US 8,651,389 B2

SYSTEM AND METHOD FOR IDENTIFYING AND TRACKING SHOPPING CARTS

FIELD OF THE INVENTION

The present invention relates to shopping cart identification systems and more specifically to a system and method for identifying and tracking shopping carts using vision based technologies.

BACKGROUND OF THE INVENTION

Retail and strategic planning as well as marketing is becoming an increasing need in many retail stores such as shopping malls, supermarkets etc. Obtaining insight into customer behavior in the retail store which can serve as inputs for strategic management applications to manufacturers and retailers is therefore in great demand. Tracking movement of customers through the store and profiling shopping experience of the customer provides an unprecedented visibility into customer behavior and shelf activity.

Various conventional shopping cart identifications systems (SCIDs) are used to identify and track shopping carts but due to inherent limitations these SCIDs do not provide an efficient, accurate and cost effective solution. For example, environmental settings of a shopping mall may not be favorable for efficient functioning of certain hardware based SCIDs such as Radio Frequency Identification (RFID) based systems, barcodes or reflective barcodes, Global Positioning System (GPS) tracking, electronic device with wireless transceiver, infrared beacons, and magnetic sensors etc. Installation of such systems entails recurring maintenance and running costs such as cost of battery powered or data agent setups required by other systems. Drawbacks associated with computer vision based solutions is that traditionally image or video processing techniques are computationally expensive as well as complex and result in requirement of expensive Digital Signal Processing (DSP) kits and cameras as initial investment. Also, the computer vision based solutions do not provide accurate identification of shopping carts as the solutions do not cater to basic occurrences of a retail store setup that may inflict poor quality on image output.

In light of abovementioned disadvantages, there is a need for a system and method for identifying and tracking shopping carts in an economical viable and efficient manner. In addition, there is a need for a system and method that facilitates accurate recognition of identity data associated with shopping carts. Further, there is a need for a system and method that accurately identifies a shopping cart by overcoming poor quality such as noise and occlusion imposed by a retail store set up. Also, there is a need for a system and method which is simple, robust and cost effective with minimal complexities in interpretation of image representing identification of shopping cart and minimal disruption or alteration of the retail store infrastructure.

SUMMARY OF THE INVENTION

A method for designing one or more identity plates is provided. The one or more identity plates are placed on one or more shopping carts. In various embodiments of the present invention, the method comprises representing a unique identity data on one or more identity plates using an identification code. The method further comprises encoding the unique identity data employing one or more symbols having one or more physical characteristics. The association between the one or more symbols and the identification code is predetermined.

In an embodiment of the present invention, representing identity data on one or more identity plates using an identification code comprises determining a range of identity data based on number of shopping carts and determining a number system to represent the range of identity data in the form of numbers. In another embodiment of the present invention, the number system comprises a decimal number system, an octal number system or any other appropriate number system.

In an embodiment of the present invention, encoding the identity data employing one or more symbols having one or more physical characteristics comprises encoding the numbers using symbols having one or more physical characteristics and representing the symbols in a predetermined number of rows and columns of a grid arrangement in the one or more identity plates. In an embodiment of the present invention, the physical characteristics comprise length, breadth, color, thickness, symmetry and orientation of the symbols. In another embodiment of the present invention, encoding the identity data comprises introducing interspacing between the symbols in the grid arrangement of the identity plate. In yet another embodiment of the present invention, the method further comprises designing a distinct border for each of the identity plates.

A method for identifying one or more shopping carts in a retail store is provided. In various embodiments of the present invention, the method comprises receiving an input image stream of one or more shopping carts. A unique encoded identity plate is placed on each of the one or more shopping carts. The method comprises extracting an image of the unique encoded identity plate from the received input image stream. The identity plate comprises unique encoded identity data corresponding to the one or more shopping carts. Further, the method comprises analyzing the encoded identity data to determine one or more physical characteristics of symbols representing the identity data and recognizing the symbols based on the one or more physical characteristics. Furthermore, the method comprises translating the recognized symbols to corresponding unique identity data to identify the one or more shopping carts. The translation is performed by matching the symbols with one or more pre-stored symbols. The pre-stored symbols are mapped to one or more identity data.

In an embodiment of the present invention, the method further comprises tracking path taken by the one or more identified shopping carts in the retail store by determining location of one or more video sensors that captures the image stream of the one or more shopping carts using at least one of: identity data of the one or more shopping carts, identity data of one or more video sensors and timestamp.

In another embodiment of the present invention, receiving the input image stream of one or more shopping carts having unique encoded identity plate comprises performing median filtering for removal of noise from the image stream. In yet another embodiment of the present invention, extracting an image of the unique encoded identity plate from the input image stream comprises performing image segmentation on the input image stream.

In an embodiment of the present invention, recognizing symbols based on the one or more physical characteristics comprises recognizing one or more symbols corresponding to one or more numbers representing the identity data. In another embodiment of the present invention, translating the recognized symbols to the identity data comprises generating a resultant matrix having each of the symbols mapped to corresponding numbers.

A system for identifying one or more shopping carts in a retail store is provided. In various embodiments of the present invention, the system comprises one or more identity plates having unique identity data of the one or more shopping carts. The identity data is encoded employing predetermined symbols. The system further comprises one or more video sensors configured to capture an image of the one or more shopping carts and relay the captured image for identification. Furthermore, the system comprises an identification system configured to receive the captured image and decode the identity data by analyzing one or more physical characteristics of the symbols.

In an embodiment of the present invention, the identification system comprises a symbol recognition module configured to recognize one or more symbols corresponding to one or more numbers representing the identity data.

In an embodiment of the present invention, the system further comprises a path extraction system configured to receive identity data corresponding to each of the shopping carts and identity data corresponding to the one or more video sensors from the identification system and track path taken by the one or more identified shopping carts in the retail store by determining location of the one or more video sensors using the received data.

In an embodiment of the present invention, the one or more identity plates are made of at least one of: thin paper, metal sheets and any other appropriate material. In another embodiment of the present invention, the one or more video sensors comprise low resolution Complementary Metal Oxide Semiconductor (CMOS) cameras positioned to capture an axial view of one or more aisles of the retail store.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for identifying and tracking shopping carts is provided. The invention provides for identifying one or more shopping carts and tracking the paths taken by customers in a retail store using images of identity plates installed on corresponding shopping carts. Each identity plate includes identity data for each of the shopping carts and is encoded using symbolic visual representation, which caters to poor quality that a retail store set up may inflict on images of the identity plates. The images are captured using simple, cost-effective image or video capturing devices which are distributed throughout the retail store and are further processed employing computationally simple vision-based solutions. The symbolic visual representation facilitates efficient recognition of identity data associated with the shopping carts from the captured images. The identities of shopping carts captured by the video capturing devices, the time of capturing the shopping cart identities and locations of the video capturing devices are used to compute the paths taken by each shopping cart. Further, the invention provides for an easily scalable solution to address requirements of a large retail store and greater number of shopping carts. Furthermore, the implementation of the invention is completely automated and independent of customer interaction.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
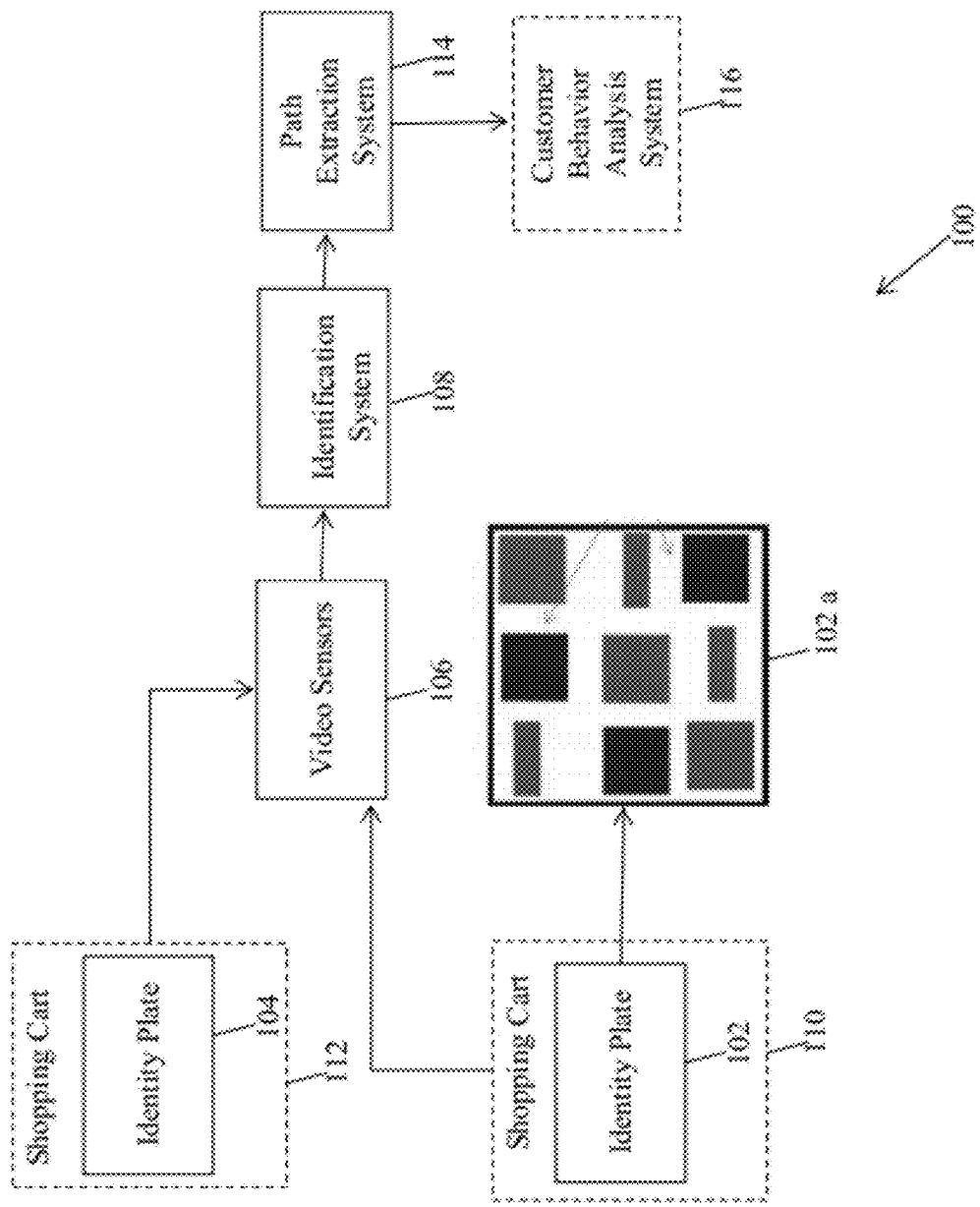
FIG. 1 is a block diagram of a system for identifying and tracking shopping carts, in accordance with an embodiment of the present invention.

FIG. 1 illustrates a block diagram of a system for identifying and tracking shopping carts, in accordance with an embodiment of the present invention. The system 100 comprises identity plates 102, 104 installed on corresponding shopping carts 110, 112, video sensors 106, identification system 108 and path extraction system 114. In various embodiments of the present invention, one or more shopping carts are present in a retail store and each shopping cart has a unique identity plate installed on it.

In an embodiment of the present invention, the identity plates 102, 104 are coded plates which include identity data that is unique to the shopping carts 110, 112. In an embodiment of the present invention, the identity plates 102, 104 may be made of thin paper. In another embodiment of the present invention, the identity plates 102, 104 may be made of metal sheets. In an embodiment of the present invention, the identity plates 102, 104 may be installed on front portion of the shopping carts 110, 112. Such an installation provides maximum visibility, availability of usable area in the shopping carts 110, 112 and averting possibility of customer placing his hands over the identity plates 102, 104 while navigating through the retail store.

In various embodiments of the present invention, the identity data may include numbers represented by one or more identification codes. The numbers are encoded using one or more visual representation with distinct parameters and pertaining to a particular graphical scheme of encoding. In an embodiment of the present invention, the numbers may be encoded using distinct symbols having different physical characteristics which are maximally differentiable and identifiable. The physical characteristics may include, but are not limited to, length and breadth, orientation along major axis (e.g. vertical and horizontal i.e. 90 degree or 0 degree), symmetry, thickness and color. The thickness is depicted graphically and colors are typically represented by a solid color which is a three dimensional representation of any color model e.g. RGB, HSV (Hue, Saturation and Value), HSL (Hue, Saturation and Lightness) etc.

The symbols are designed to address real life scenario of a retail store where there is a possibility of symbols of the identity plates 102, 104 getting completely or partially occluded or distorted and hence unrecognizable. The physical characteristics which render the symbols easily facilitate efficient recognition of the symbols under adverse conditions.

In an embodiment of the present invention, the identification code may be ascertained by determining a range of identity data based on the number of shopping carts present in the retail store. In an exemplary embodiment of the present invention, the number of shopping carts in the retail store is one thousand. Identity data may include numbers represented using decimal number system (base=10 and uses digits from 0 to 9). Ten distinct symbols may be used to represent a range of identity data which is possible using the decimal number system. For example, the symbols may include a thick horizontal bar, a thin horizontal bar and a circle. The symbols may be of different colors such as red, blue and green. Using appropriate combinations of the symbols, each of the thousand shopping carts in the retail store can be allotted identity data from 0 to 999. In another exemplary embodiment of the present invention, identity data may be represented using a different number system such as octal (base=8 and uses digits from 0 to 7) and appropriate combinations of distinct symbols may be used to represent a range of identity data which is possible using the octal number system. In an embodiment of the present invention, appropriate combinations of the symbols may be ascertained and mapped with various numbers according to different identification codes listed out in a codebook specification. The codebook specification may be a visual codebook which includes specifications of various symbols and their physical characteristics such as length, breadth, thickness and color. In yet another exemplary embodiment of the present invention, the number of physical characteristics may be increased and allotted to any number of shopping carts. Any other number system or any other identification code may be used and corresponding symbols may be added to the identity plates 102, 104 of each of the shopping carts. In various embodiments of the present invention, as the identity plates 102, 104 are encoded with visually, maximally separable distinct colored symbols, the system is independent of the choice of numeric coding and any traditional numeric system may be employed in the identity plates 102, 104. The codebook specification may be used to translate coded symbols in the identity plates 102, 104 into the numeric system.

In various embodiments of the present invention, the numbers are represented in the form of colored symbols in every row and column of an m by m grid arrangement. The grid arrangement also facilitates to introduce visual redundancy in the identity plates 102, 104 which in turn facilitates to increase robustness and effectiveness of the system 100. The colored symbols may be arranged spatially in the identity plates 102, 104 and may be provided in every row and column of the m by m grid for redundancy. The grid arrangement further facilitates to introduce sufficient interspacing between the symbols to ascertain maximal separation therebetween which in turn facilitates to surmount complete or partial occlusions and any inter symbol ambiguity during processing for recognition.

In an exemplary embodiment of the present invention, the m by m grid may include a 3 by 3 grid arrangement. Referring to FIG. 1, 102*a* represents a coded identity plate 102, in accordance with an exemplary embodiment of the present invention. The identity data is a three digit number, example, 450. The digit 4 may be coded using a thick horizontal bar symbol and color of the horizontal bar may be red. The digit 5 may be coded using a square symbol and color of the square may be red. The digit 0 may be coded using a square symbol and color of the square may be blue. Every column and row of the identity plate 102 is provided with all three digits for redundancy. Further, the interspacing between the symbols is such that the symbols are maximally separated. As illustrated by 102*a*, a distinct boundary for the identity plate 102 is designed to efficiently convey presence of an identity plate 102*a* from the visual data. The borders of identity plate 102 are designed so as to be maximally distinguishable. This enables the identity plate 102 to be distinctly located and interpreted by the system 100.

The video sensors 106 are electronic devices which are used to capture images of moving objects in the retail store. In an embodiment of the present invention, the video sensors 106 may include simple, low cost cameras of relatively low resolution. In an embodiment of the present invention, the cameras may be installed in a grid arrangement. In an exemplary embodiment of the present invention, the video sensors 106 include Complementary Metal Oxide Semiconductor (CMOS) cameras with resolution less than or equal to 2 megapixel. These cameras are low power cameras with minimal hardware requirements such as Digital Signal Processor (DSP) processors. In an embodiment of the present invention, the cameras may interact with each other or with surveillance video feeds for capturing the movement of shopping carts in the retail store.

In another embodiment of the present invention, the video sensors 106 may be installed to monitor the aisles of the retail store where various merchandise are displayed. The video sensors 106 may be positioned suitably for capturing an axial view of the aisle for maximum coverage. The video sensors 106 are focused to capture presence of shopping carts in an aisle of the retail store. In an exemplary embodiment of the present invention, two video sensors may be placed in each aisle where one video sensor captures shopping carts moving in one direction along the aisle and the other video sensor captures shopping carts moving in the opposite direction.

Further, the video sensors 106 enable quick and scalable expansion of the system 100 to cover all regions of the retail store. In an embodiment of the present invention, the output of the video sensors 106 is an image stream. The image stream is captured in a bitmap color image format and provided as an input to the identification system 108 in Joint Pictures Experts Group (JPEG), Tagged Image File Format (TIFF), Portable Network Graphics (PNG), Graphics Interchange Format (GIF), Moving Picture Experts Group (MPEG 4) or any other compressed image file format. In an embodiment of the present invention, the image stream is communicated by the video sensors 106 to corresponding identification systems 108 which are coupled to the video sensors 106. In another embodiment of the present invention, the image stream is relayed by the video sensors 106 to the identification system 108 over a data network. The data network may include a communication network with minimal bandwidth and setup requirements.

The identification system 108 receives the input image stream from the video sensors 106 and processes the input image stream to identify the identity plates 102, 104 and decode the identity data present in the identity plates 102, 104. The identification system 108 uses symbols presented by the input image stream and proceed to detect a shopping cart's encoded plate information rather than shopping cart itself thereby averting requirement of detecting shape of the shopping cart. In an embodiment of the present invention, the identification system 108 identifies the identity plates 102, 104 independently in the presence of the shopping carts 110, 112.

In an embodiment of the present invention, the identification system 108 processes all input image stream independent of previous and subsequent acquisition. In an embodiment of the present invention, the identification system 108 comprises one or more modules for performing acquisition of the image input accurately identifying the shopping carts. The identification system 108 retrieves the identity data encoded in the identity plate 102, 104 of the shopping carts 110, 112 from the image input. The physical characteristics of symbols representing the identity data in the identity plate 102, 104 combine to form a characteristic feature for every symbol and this feature is used as a measure of confidence to gauge accuracy of identification. The variation in individual characteristics of length, breadth, color etc. coupled with orientation of the symbols enables the identification system 108 to correctly identify and retrieve the symbols for processing and decoding the identity data. In an embodiment of the present invention, the coding format employed in the identity plates 102, 104 facilitates the identification system 108 to obtain identity data with minimal processing and to process partial, poor contrast and corrupted image input stream. In another embodiment of the present invention, simple image and/or video processing techniques are employed to process the input image stream which does not involve complex calculations. The coding employed in the identity plates 102, 104 facilitates the identification system 108 to process the image stream and overcome poor quality such as noisy images, poor contrast images or bad lighting, mud marks or blotches, strip removal, and partial occlusion that may be inflicted on the input image stream due to the retail store set up by video sensor 106.

In an embodiment of the present invention, the identification system 108 generates a message that includes a timestamp and identity of specific video sensor 106 that records presence of the shopping carts 110, 112. The identification system 108 communicates the timestamp, identity of the video sensor 106 and identity of shopping carts 110, 112 to a path extraction system 114. In an embodiment of the present invention, the identification system 108 eliminates the need for any storage requirement as the input image stream received by the identification system 108 is identified in real time and the image is evaluated and represented for tracking to the path extraction system 114 in real time.

The path extraction system 114 is a centralized system which receives timestamp, identity of the video sensor 106 and identity of shopping carts 110, 112 to determine path taken by the shopping carts 110, 112 in the retail store. In an embodiment of the present invention, path extraction system 114 uses the received information (timestamp, identity of the video sensors and identity of shopping carts) to chart the geospatial route adopted by the identified shopping carts 110, 112 in the retail store by identifying location of the video sensor 106 using standard algorithms. In an exemplary embodiment of the present invention, the path extraction system 114 assesses layout specification of the grid of video sensor 106 to determine path taken by the identified shopping carts 110, 112.

In an embodiment of the present invention, the output of the path extraction system 114 may be used as an input to a customer behavior analysis system 116 which handles strategic management applications of the retail store based on customer behavior analysis. The additional information related to location data and timestamp further serves as inputs and aid in deducing customer behavior to predict promotional and strategic planning operations. The system 100 therefore facilitates to map the behavior and product purchase habits of customers.

Figure 2:
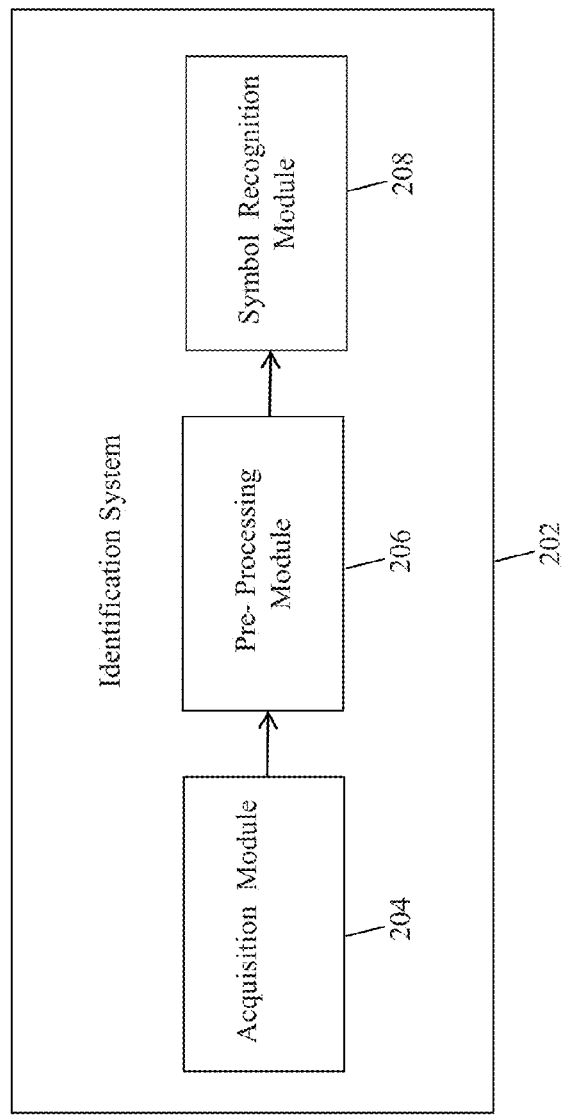
FIG. 2 illustrates a detailed block diagram of an identification system, in accordance with an embodiment of the present invention.

FIG. 2 illustrates a detailed block diagram of the identification system 202, in accordance with an embodiment of the present invention. The system comprises an acquisition module 204, a pre-processing module 206 and a symbol recognition module 208.

The acquisition module 204 receives the input image stream from one or more video sensors. In an embodiment of the present invention, the input image stream may be received in any of Joint Pictures Experts Group (JPEG), Tagged Image File Format (TIFF), Portable Network Graphics (PNG), Graphics Interchange Format (GIF), MPEG 4 or any other compressed image file format. In another embodiment of the present invention, the image may be standardized and resized for further processing.

The pre-processing module 204 receives the input image stream from acquisition module 202 and processes the image for removal of poor quality from the image and enhancing quality of the input image. The pre-processing of the input image facilitates efficient analysis of the image for symbol recognition. In an embodiment of the present invention, presence of partial image of the identity plate 102 (FIG. 1) is identified in the input image stream due to visual redundancy introduced in the coded identity plate 102 and processed for further recognition. In another embodiment of the present invention, presence of complete image of the identity plate 102 (FIG. 1) is identified and processed for further recognition.

In an embodiment of the present invention, the image may be corrupted due to noise introduced by the video sensors 106 (FIG. 1) or errors during acquisition of the image due to dust or dirt etc. which damages pixels of the image. In an exemplary embodiment of the present invention, the noisy effects are removed by using median filtering which includes calculating median value of pixels in the image and replacing the corrupted pixel value with median value. The median value may be calculated by traversing the image with a smoothing mask to find the median of pixel values in a 3 by 3 neighborhood. In another exemplary embodiment of the present invention, smudges or blotches in the image may be removed by replacing damaged pixel values with neighboring pixel values. In yet another exemplary embodiment of the present invention, the image is converted to a grayscale image. In another exemplary embodiment of the present invention, the image is translated into a binary image. Pixel values below a predetermined threshold are translated to level 0 and pixel values above a predetermined threshold are translated to level 1. In an embodiment of the present invention, image segmentation is performed on the image to separate out region of interest from the entire image. Accordingly, portion representing the identity plate 102 (FIG. 1) is extracted from the image. In an exemplary embodiment of the present invention, connected and unconnected pixels of the image are uniquely labeled and the pixels representing the identity plate 102 (FIG. 1) are extracted. In another exemplary embodiment of the present invention, morphological image processing such as dilation, erosion and closing is performed on the image which facilitates filling up discontinuities and gaps in the image and removal of protrusions and extensions present in the image.

The symbol recognition module 208 facilitates analyzing the pre-processed image to recognize symbols in the identity plate 102 (FIG. 1) and retrieve the coded identity data. In various embodiments of the present invention, the symbol recognition module 208 analyzes image representation of the identity plate 102 (FIG. 1) of a specific shopping cart 110 (FIG. 1) by interpreting the symbols on the basis of the identification code of the identity data. In an embodiment of the present invention, the symbols are recognized by analyzing various physical characteristics associated with the symbols. In an embodiment of the present invention, edges corresponding to the symbols in the identity plate image are determined using known edge detection image processing techniques. In another embodiment of the present invention, border of the identity plate is determined using standard boundary detection algorithms. The distinct border facilitates accurate determination of the identity plate image as the symbol recognition module 208 restricts visual analysis to visual stimuli within the border. The symbol recognition module 208 is, thus, presented with the portion of the acquired image data comprising only the symbols. In an embodiment of the present invention, spatial cropping process may be employed to retrieve the symbols. In another embodiment of the present invention, interspacing between the symbols is determined. Interspacing between symbols is determined based on non-ideal conditions for recognition of encoded symbols at a predefined distance taking into consideration a retail floor design. In yet another embodiment of the present invention, presence of individual symbols in the identity plate image is validated.

In an embodiment of the present invention, the identity plate 102 (FIG. 1) image is processed for final recognition of symbols by analyzing the one or more physical characteristics such as length, breadth, color, and orientation. In an exemplary embodiment of the present invention, the physical characteristics are recognized by standard image processing techniques such as edge or boundary detection techniques.

The physical characteristics form features that are extracted and evaluated with a confidence measure for accurate recognition of the identity data. In another embodiment of the present invention, the recognized symbols may be matched with the symbols listed out in the codebook specification. This presents a confidence measure of the symbols which are to be translated to corresponding numbers and finally to the identity data. In an embodiment of the present invention, a recognized spatial matrix is created which comprises of the recognized numbers corresponding to the symbols. Every cell of the spatial matrix comprises of a maximally separable symbol which is recognized based on its properties listed in the codebook specifications. The recognized symbols are, then, translated to corresponding numbers based on the encoding scheme mentioned in the codebook. The encoding scheme delineates various symbols mapped with various numbers according to various identification codes. A resultant matrix is obtained which comprises the visual redundancy mapped to corresponding numeric redundancy. Due to the visual redundancy introduced in the coded identity plate image, every row and column of the spatial matrix can be translated to the numbers to accurately decode the identity data. In an exemplary embodiment of the present invention, a three digit unique identity data of a specific shopping cart is represented adequately in every row and every column of a recognized 3 by 3 matrix. For example, if the identity plate 102 (FIG. 1) comprises a solid blue circle, a thick red line and a red circle, it can be ascertained that these symbols are arranged with spatial or visual redundancy on the identity plate 102 (FIG. 1) to represent the three digit numeric identity. The 3 by 3 matrix is evaluated on a cell basis to successfully retrieve the individual symbol properties such as color, length, breadth etc. to recreate the numeric representation.

Advantageously, the present invention facilitates charting of customer paths to serve as input for a customer behavior analysis system 116 (FIG. 1) which facilitates to analytically deduce customer behavior and suggest promotional strategies. Further, the present invention can be developed to handle problems of "shoplifting" and "basket run" which involves a potential customer evading billing stations and exiting the store.

Figure 3:
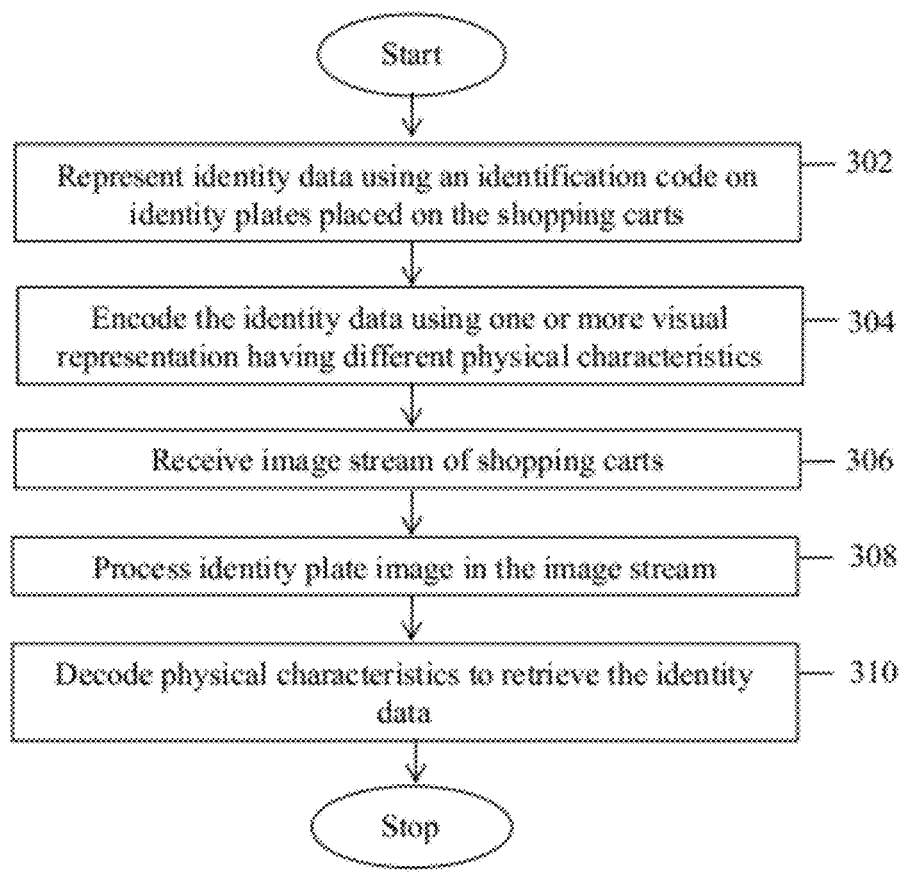
FIG. 3 is a flowchart illustrating a method for identifying shopping carts, in accordance with an embodiment of the present invention.

FIG. 3 illustrates a flowchart for a method that facilitates identifying and tracking one or more shopping carts in a retail store, in accordance with an embodiment of the present invention.

At step 302, identity data is represented using an identification code on identity plates placed on one or more shopping carts. In an embodiment of the present invention, the identity data may be numbers represented using one or more number systems such as decimal number system, hexadecimal number system, octal number system etc. The identity plates are placed on frontal portion of the one or more shopping carts.

At step 304, identity data is encoded using one or more visual representation having different physical characteristics. In an embodiment of the present invention, the one or more visual representation include distinct symbols having clearly distinguishable physical characteristics such as length, breadth, orientation, symmetry, thickness and color. The symbols may be of different shapes such as thick rectangular bar, thin rectangular bar, square, circle etc. and of different colors. The color may pertain to color models such as RGB (Red, Green, Blue), HSV (Hue, Saturation, Value), HSL (Hue, Saturation, Lightness) etc. Each of the numbers is encoded using the distinct symbols and arranged spatially in the identity plate. In an embodiment of the present invention, the symbols are arranged in every row and column of an m by m grid arrangement. Presence of symbols in each row and column introduces redundancy in the color coded identity plate. Further, the symbols are maximally interspaced.

At step 306, image stream of the one or more shopping carts is received. In an embodiment of the present invention, images of the one or more shopping carts having the identity plates moving in the retail store are captured by low resolution, low power video sensors such as CMOS (Complementary Metal Oxide Semiconductor) cameras. The video sensors are positioned suitably for capturing axial view of the aisle for maximum coverage of the path taken by the one or more shopping carts. The image stream is received by an identification system in any of compressed image file format such as Joint Pictures Experts Group (JPEG), Tagged Image File Format (TIFF), Portable Network Graphics (PNG), Graphics Interchange Format (GIF), Moving Picture Experts Group (MPEG 4) etc. over a data network.

At step 308, identity plate image in the image stream is processed. In an embodiment of the present invention, identity plate image is segmented from the image stream and processed for recognizing the identity data coded in the identity plate. In an embodiment of the present invention, the identity plate image is processed for removal of noise and other poor quality such as smudges or blotches using image processing techniques.

At step 310, visual representation is decoded to retrieve the identity data. In an embodiment of the present invention, physical characteristics associated with the visual representation are analyzed and identity data is retrieved. In another embodiment of the present invention, a recognized spatial matrix is created which comprises of the recognized numbers corresponding to the symbols. Due to the visual redundancy introduced in the coded identity plate image, every row and column of the spatial matrix can be translated to the numeric digits to accurately decode the identity data.

The present invention may be implemented in numerous ways including as a apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A method for designing one or more identity plates, wherein the one or more identity plates are placed on one or more shopping carts, the method comprising:
representing a unique identity data using an identification code;
encoding the unique identity data employing a plurality of symbols, each having one or more physical characteristics, wherein the association between the plurality of symbols and the identification code is predetermined; and
forming the encoded unique identity data on an identity plate, wherein formation of the encoded unique identity data includes provision of a data redundancy,
the provision of data redundancy comprising forming the plurality of symbols encoding the unique identity data on the identity plate in a grid having at least two columns and at least two rows, such that the plurality of symbols encoding the unique identity data is entirely formed (i) in at least a first row and in at least a second row or (ii) in at least a first column and in at least a second column of the grid or (iii) in at least one column and in at least one row, of the grid.

2. The method of claim 1, wherein representing unique identity data on one or more identity plates using an identification code comprises:
determining a range of identity data based on number of shopping carts; and
determining a number system to represent the range of identity data in the form of numbers.

3. The method of claim 2, wherein the number system comprises a decimal number system or an octal number system.

4. The method of claim 1, wherein the physical characteristics comprise length, breadth, color, width, symmetry and orientation of the symbols.

5. The method of claim 1, wherein encoding the unique identity data comprises introducing interspacing between the symbols in the grid arrangement of the identity plate.

6. The method of claim 1 further comprising designing a distinct border for each of the identity plates.

7. The method of claim 1, wherein the plurality of symbols encoding the unique identity data is entirely formed in every row and in every column of the grid.

8. A method for identifying one or more shopping carts in a retail store, the method comprising:
receiving an input image stream of one or more shopping carts, wherein a unique encoded identity plate is placed on each of the one or more shopping carts;
extracting an image of the unique encoded identity plate from the received input image stream, wherein the identity plate comprises unique encoded identity data corresponding to the one or more shopping carts, and wherein formation of the encoded unique identity data on the identity plate includes provision of a data redundancy;
analyzing the encoded identity data to determine one or more physical characteristics of symbols representing the identity data;
recognizing the symbols based on the one or more physical characteristics; and
translating the recognized symbols to corresponding unique identity data to identify the one or more shopping carts, wherein the translation is performed by matching the symbols with one or more pre-stored symbols, the pre-stored symbols being mapped to one or more identity data;
wherein the provision of data redundancy comprises forming the plurality of symbols encoding the unique identity data on the identity plate in a grid having at least two columns and at least two rows, such that the plurality of symbols encoding the unique identity data is entirely formed (i) in at least a first row and in at least a second row or (ii) in at least a first column and in at least a second column or (iii) in at least one column and in at least one row, of the grid; and
wherein analyzing the encoded identity data comprises analyzing physical characteristics of symbols within a row or a column in which the unique identity data is entirely formed.

9. The method of claim 8 further comprising:
tracking path taken by the one or more identified shopping carts in the retail store by determining location of one or more video sensors that captures the image stream of the one or more shopping carts using at least one of: identity data of the one or more shopping carts, identity data of one or more video sensors and timestamp.

10. The method of claim 8, wherein receiving the input image stream of one or more shopping carts having unique encoded identity plate comprises performing median filtering for removal of noise from the image stream.

11. The method of claim 8, wherein extracting an image of the unique encoded identity plate from the input image stream comprises performing image segmentation on the input image stream.

12. The method of claim 8, wherein recognizing symbols based on the one or more physical characteristics comprises recognizing one or more symbols corresponding to one or more numbers representing the identity data.

13. The method of claim 12, wherein translating the recognized symbols to the identity data comprises generating a resultant matrix having each of the symbols mapped to corresponding numbers.

14. The method of claim 8, wherein the plurality of symbols encoding the unique identity data is entirely formed in every row and in every column of the grid.

15. A system for identifying one or more shopping carts in a retail store, the system comprising:
one or more identity plates having unique identity data of the one or more shopping carts, wherein the identity data is encoded employing predetermined symbols and is formed on each identity plate with provision for data redundancy;
one or more video sensors configured to capture an image of the one or more shopping carts and relay the captured image for identification; and
an identification system configured to receive the captured image and decode the identity data by analyzing one or more physical characteristics of the symbols;
wherein the provision for data redundancy comprises forming the plurality of symbols encoding the unique identity data on the identity plate in a grid having at least two columns and at least two rows, such that the plurality of symbols encoding the unique identity data is entirely formed (i) in at least a first row and in at least a second row or (ii) in at least a first column and in at least a second column or (iii) in at least one column and in at least one row, of the grid.

16. The system of claim 15 further comprising a path extraction system configured to:
   receive identity data corresponding to each of the shopping carts and identity data corresponding to the one or more video sensors from the identification system; and
   track path taken by the one or more identified shopping carts in the retail store by determining location of the one or more video sensors using the received data.

17. The system of claim 15, wherein the one or more identity plates are made of at least one of: thin paper or metal sheets.

18. The system of claim 15, wherein the one or more video sensors comprise Complementary Metal Oxide Semiconductor (CMOS) cameras positioned to capture an axial view of one or more aisles of the retail store.

19. The system of claim 15, wherein the identification system comprises a symbol recognition module configured to recognize one or more symbols corresponding to one or more numbers representing the identity data.

20. The system of claim 15, wherein the encoded unique identity data is entirely represented in every row and every column of the grid.

* * * * *